(12) United States Patent
Chauvel

(10) Patent No.: US 7,600,574 B2
(45) Date of Patent: Oct. 13, 2009

(54) TRACTOR FRONT HITCH

(75) Inventor: Vincent Chauvel, Saint Gilles (FR)

(73) Assignee: Agco SA, Beauvais (FR)

( * ) Notice: Subject to any disclaimer, the term of this patent is extended or adjusted under 35 U.S.C. 154(b) by 405 days.

(21) Appl. No.: 11/157,470

(22) Filed: Jun. 21, 2005

(65) Prior Publication Data

US 2006/0016611 A1    Jan. 26, 2006

(30) Foreign Application Priority Data

Jun. 22, 2004    (GB)    ................... 0414011.7

(51) Int. Cl.
    *A01B 59/043*    (2006.01)
(52) U.S. Cl. .................................... 172/439
(58) Field of Classification Search ............. 172/272, 172/273, 275, 810, 817, 439, 442; 37/231, 37/235, 236
    See application file for complete search history.

(56) References Cited

U.S. PATENT DOCUMENTS

| | | | | |
|---|---|---|---|---|
| 3,128,830 | A | * | 4/1964 | Doering ......................... 172/7 |
| 3,432,184 | A | * | 3/1969 | Tweedy ......................... 172/272 |
| 3,520,369 | A | * | 7/1970 | Nicholson ....................... 172/7 |
| 3,561,789 | A | * | 2/1971 | Stikeleather et al. ........ 172/272 |
| 3,876,092 | A | * | 4/1975 | MacDonald ................. 414/686 |
| 4,425,970 | A | * | 1/1984 | Dwyer et al. .................... 172/7 |
| 4,515,387 | A | * | 5/1985 | Schuck ..................... 280/479.3 |
| 4,645,226 | A | * | 2/1987 | Gustavsson et al. ...... 280/476.1 |
| 4,681,336 | A | * | 7/1987 | Kryscyk ..................... 280/482 |
| 4,778,195 | A | * | 10/1988 | Vachon ........................ 280/477 |
| 5,082,065 | A | * | 1/1992 | Fletcher ....................... 172/273 |
| 5,141,385 | A | * | 8/1992 | Tibbatts et al. .............. 414/723 |
| 5,538,086 | A | | 7/1996 | Wright et al. |
| 5,697,454 | A | * | 12/1997 | Wilcox et al. ............... 172/447 |
| 5,997,024 | A | * | 12/1999 | Cowley ................... 280/478.1 |
| 6,148,927 | A | * | 11/2000 | Hoffart ........................ 172/439 |
| 6,227,304 | B1 | * | 5/2001 | Schlegel ..................... 172/439 |
| 6,321,851 | B1 | * | 11/2001 | Weiss et al. ................. 172/444 |

(Continued)

FOREIGN PATENT DOCUMENTS

FR    2061572    6/1971

(Continued)

OTHER PUBLICATIONS

The European Search Report dated Oct. 28, 2005.

*Primary Examiner*—Robert E Pezzuto
*Assistant Examiner*—Matthew D Troutman

(57) ABSTRACT

A tractor front hitch 10 is provided for mounting an implement on the front of a tractor. The hitch has socket 13 mounted for pivotal movement relative to the tractor, a pair of lower implement support links 12 which form a sub-assembly received in the socket 13, and one or more upper implement support links 14 supported from the tractor. The lower link sub-assembly 12 is moveable relative to the socket 13 between a coupling position, in which the lower link sub-assembly is at least partly withdrawable from the socket to facilitate coupling of the implement to the lower links, and a locked implement operative position in which the lower link sub-assembly 12 is locked in the socket 13. The lower link sub-assembly 12 may be moved fore and aft, and side to side relative to the socket 13 and is also rotatable in the general plane of the socket to facilitate coupling when in the coupling position.

21 Claims, 9 Drawing Sheets

U.S. PATENT DOCUMENTS

| | | | |
|---|---|---|---|
| 6,431,288 B1 * | 8/2002 | Hoffart | 172/439 |
| 6,478,094 B2 * | 11/2002 | Alexander et al. | 172/439 |
| 6,510,628 B1 * | 1/2003 | Koch | 37/348 |
| 6,830,112 B2 * | 12/2004 | Pierce | 172/439 |
| 2003/0085046 A1 * | 5/2003 | Pierce | 172/439 |

FOREIGN PATENT DOCUMENTS

| | | |
|---|---|---|
| FR | 2789846 | 8/2000 |
| GB | 1159508 | 7/1969 |
| GB | 2178290 | 2/1987 |

* cited by examiner

TRACTOR FRONT HITCH

This Application claims priority from Great Britain Patent Application No. 0414011.7, bearing filing date June 22, 2004.

BACKGROUND OF THE INVENTION

This invention relates to front hitches for coupling an implement to the front of a tractor.

Whilst such hitches are well known there are problems in actually connecting an implement to a tractor using such a hitch since it is difficult to see the implement when approaching the implement for coupling-up and this leads the much manoeuvring of the tractor and the driver having to leave the tractor go to the front of the tractor several times in an attempt to position the hitch as close as possible to the implement. This is a particular problem when a heavy implement is to be coupled to the tractor which the driver cannot drag closer to the tractor for the final positioning of the implement prior to coupling-up.

It is an object of the present invention to provide an improved form of tractor front hitch which overcomes the above problem of coupling-up.

BRIEF SUMMARY OF THE INVENTION

Thus according to the present invention there is provided a tractor front hitch for mounting an implement on the front of a tractor, the hitch comprising
  a socket mounted for pivotal movement relative to the tractor,
  a pair of lower implement support links which form a sub-assembly received in the socket, and
  one or more upper implement support links supported from the tractor,
  the lower link sub-assembly being moveable relative to the socket between a coupling position in which the lower link sub-assembly is at least partly withdrawable from the socket to facilitate coupling of the implement to the lower links and a locked implement operative position in which the lower link sub-assembly is locked in the socket.

Such a hitch arrangement greatly facilitates coupling-up of an implement since the tractor driver can move the lower links relative to the socket for the final coupling-up of the implement without needing to move the tractor or the implement.

Preferably the socket and upper support link or links are mounted on a frame carried by the tractor and extending means are provided to move the socket generally horizontally relative to the frame between the locked implement operating position and the coupling position. This facilitates further the coupling from an implement since the extending means can be used to position the links even closer to the implement.

Preferably the socket is of a tapering form being widest at its mouth and the lower link sub-assembly is of a corresponding tapering form. Thus when the lower link sub assembly is partially withdrawn from the socket the assembly is moveable fore and aft and side to side relative to the socket and is also rotatable in the general place of the socket to facilitate hitching.

A releasable stop means is preferably provided which cooperates with the socket to prevent the sub-assembly being inadvertently completely withdrawn from the socket.

An operator controlled locking means is preferably provided for locking the sub-assembly in the socket. This locking means may also move the lower link sub-assembly partially out of the socket when released.

A hydraulic socket cylinder may be provided to move the lower link sub-assembly relative to the socket.

The extending means normally comprises hydraulic cylinder means acting between the socket and frame.

A raising means, preferably in the form of hydraulic cylinders, acts between the socket and the tractor to pivot the socket about a first generally horizontal transverse axis to raise and lower the socket and hence the lower link assembly relative to the tractor.

Preferably the socket is mounted on one end of a pair of support members for pivoting about the first generally horizontal transverse axis, the other end of the support members being pivoted about a second generally horizontal transverse axis on the frame, the extending means acting between the frame and a portion of the support members intermediate their ends so that operation of the extending means pivots the support members in a fore and aft sense relative to the frame about the second axis to move the socket between its retracted and extended positions.

The raising means may act on the frame via a bell crank member to which the or each top link is also connected. The bell crank member is also connected with the support member by generally horizontally extending link means.

For added convenience operator control means for the extending means and the raising means are preferably provided at the front of the tractor. These may conveniently comprise rocker switches or other control members position at the front of the tractor which allow the socket to be moved fore and aft or raised and lowered relative to the frame. Similarly, operator control means may be provided at the front of the tractor for the socket cylinder.

The invention also provides a hitch of the form described above for use with a ground engaging implement in which a sensing system is provided which provides a signal representative of only the horizontal component of the forces applied to the implement by the ground thereby eliminating the effect of the weight of the implement from the sensed signal, and a control means is provided which receives signals from the sensing system and from the tractor operator as to the desired operating condition of the implement and which compares these signals to provide an output signal to the raising means to adjust the working position of the implement to meet the desired operating condition of the implement.

In such a hitch, the sensing system may comprises a sensor connected with the intermediate portion of the support member which mounts the socket on the frame and the geometry of the connections between the components of the hitch is such that, when the hitch is in a neutral working position with the raising means acting vertically and the links means horizontal, only the horizontal component of the forces applied to the upper and lower links by the implement is transmitted to the sensor via the hitch.

The level of pressure in the hydraulic cylinder means of the extending means may be used as the indication of the level of the horizontal component of the forces acting on the implement.

BRIEF DESCRIPTION OF THE DRAWINGS

Several embodiments of the present invention will now be described, by way of example only, with reference to the accompanying drawings in which.

DETAILED DESCRIPTION OF THE INVENTION

Figure 1:
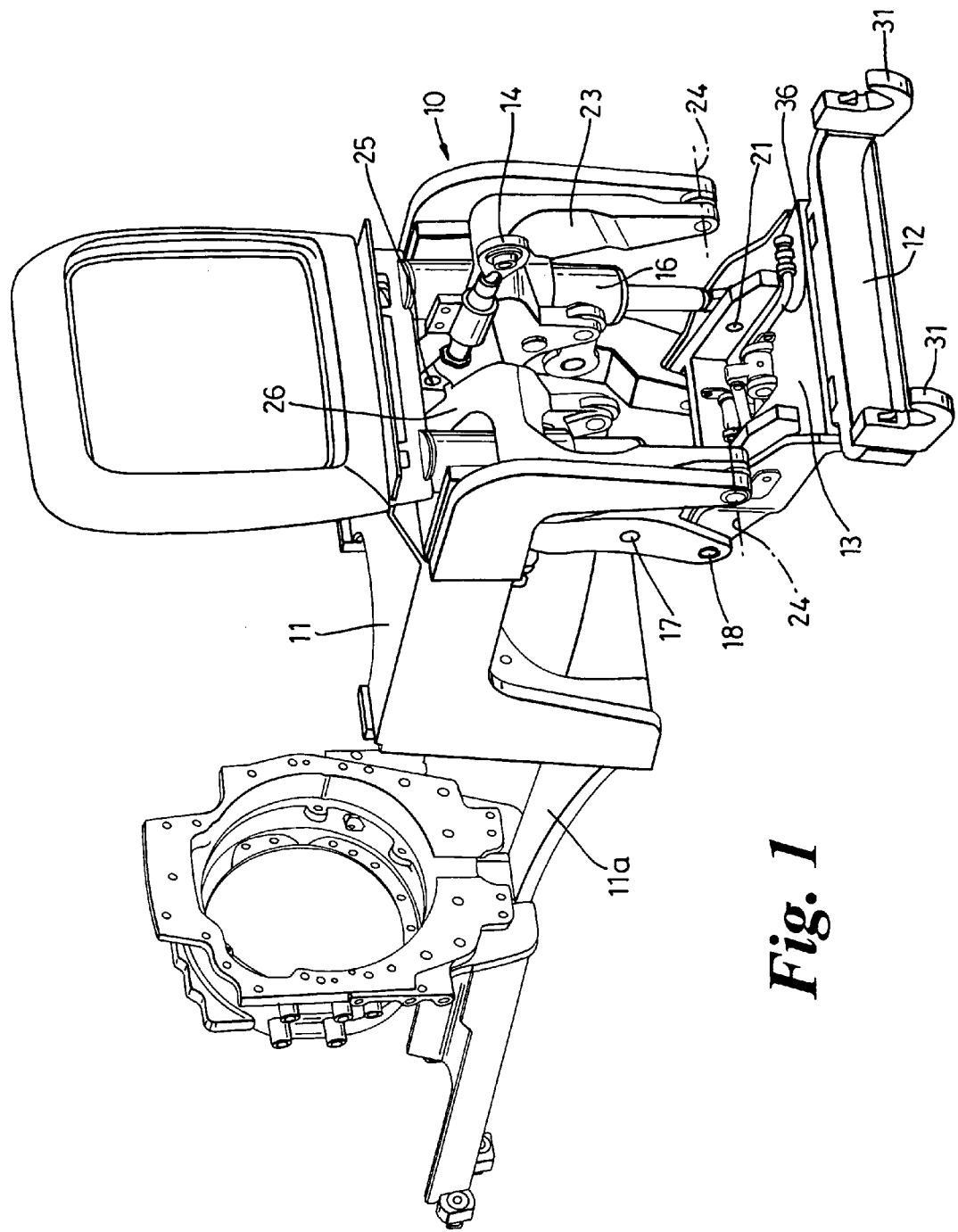
FIG. 1 is a perspective view of a tractor front hitch in accordance with the present invention.

Referring to the drawings a tractor hitch 10 comprises a frame 11 bolted to the tractor chassis 11a, a pair of lower implement support links 12 which form a unitary sub-assembly and which are received in a socket 13 mounted on frame 11, an upper implement support link 14, and two pairs of hydraulic cylinders 15 and 16 for moving the socket and hence the links 12 and 14 relative to the frame as will be described below.

The socket 13 is mounted on frame 11 via a pair of support arms 17 which are each pivoted at one end via pins 18 to the socket and at the other end via pins 19 on to frame 11. Cylinders 15 act between the frame 11 and arms 17 via pins 20 which pass through the intermediate portions of the arms to move the socket 13 fore and aft relative to the frame 11.

The second pair of cylinders 16 are connected with socket 13 via pins 21 and act on the frame 11 via pins 22 which connect the cylinders with a bell crank 23 which is in turn pivoted on frame 11 via pins 24. Operation of cylinder 16 raises and lowers the socket relative to the frame. Top link 14 is also mounted on bell crank 23 via pin 25 which passes through flanges 26. Bell crank 23 is connected with support arms 17 via a pair of generally horizontally extending links 27 using pins 28 and 29 respectively.

As can be seen from FIGS. 4 to 7, the socket 13 is of generally triangular tapering form having a mouth 30 into which lower link sub-assembly 12 is inserted. Sub-assembly 12 is also of triangular form and has a pair of implement mounting hooks 31 and two side rails 32.

The assembly 12 can be locked in a fully retracted position in socket 13 by a driver operated locking mechanism 35 which includes an operating lever 36 pivoted on the socket 13 by a pin 37 which extends through flanges 38. Lever 36 operates a latch 39 pivoted on socket 13 by pin 40 via a link 41. When latch 39 is operative it engages behind a latching abutment 42 on sub-assembly 12 (see FIG. 5) to hold the assembly within the socket. To release the sub-assembly for movement relative to the socket the lever 36 is moved upwardly in the direction of arrow X to disengage latch 39 from abutment 42. This movement of lever 36 is also arranged to cause lever 43 attached to lever 36 to press on a surface 44 of sub assembly 12 to ease the sub-assembly out of the socket to facilitate relative movement of the sub-assembly relative to the socket. The assembly 12 is manually moveable both in a fore and aft sense and a side to side sense relative to socket 13 and can also rotate within the general plane of the socket when the latch 39 is released. A removable stop pin 33 is provided on assembly 12 which engages in triangular opening 34 in the base of assembly 13 to prevent the complete accidental removal of sub-assembly 12 from socket 13.

Operation of the cylinders 15 and 16 is controlled by a hydraulic supply system 45 (see FIG. 2) which also supplies pressurised fluid for the operation of other functions on the tractor such as the rear hitch etc. This system includes a pump 46 which supplies pressurised fluid from a reservoir 48 to a block of solenoid-operated hydraulic control valves 47 two of which (47a and 47b) are connected to cylinders 15 and 16 respectively. An electronic control unit 49 receives control inputs from the tractor operator from either a cab mounted pair of three-position rocker switches 50,51 or a similar pair of three position rocker switches 52,53 mounted near the front of the tractor. Rocker switches 50 and 52 when operated send signals to control unit 49 to command a fore or aft movement of the hitch relative to the frame 11 depending on whether portion 50a,52a or portion 50b,52b of the switch is pressed. These signals are processed by control unit 49 which in turn issues signals to cylinders 15 proportional to the operation of switches 50,52 to move support arms 17 fore or aft appropriately.

Similarly operation of rocker switches 51,53 sends signals to control unit 49 to command raising or lowering of the hitch relative to the frame depending on whether portion 51a,53a or portion 51b,53b of the switch is operated. These signals are processed by control unit which in turn issues signals to cylinders 16 proportional to the operation of switches 51,53 to raise or lower the socket 13 appropriately.

The geometry of the hitch is such that when sub-assembly 12 is locked in socket 13 and socket 13 is extended by cylinders 15 the implement engaging hooks 31 and the end of top link 14 attached to the implement move substantially together. When sub-assembly 12 is unlatched from socket 13 for hitching the distance of hooks 31 from pins 18 increases and provision therefore needs to be provided for extending the length of the top link 14. Thus the link 14 is preferably of the hydraulic variable length type which includes a hydraulic cylinder 14a (see FIG. 2). This variable length top link is controlled by a further rocker switch 54 in the cab and a further rocker switch 55 mounted near to the front of the tractor. These switches have switch portions 54a and 55a which when activated hydraulically extended top link 14 and when switch portions 54b and 55b are operated reduce the length of the top link. Each further switch 54 and 55 activates a 4-position solenoid value 47c which admits or releases pressure from hydraulic top link 14. Each switch 54 and 55 has a float button 54c and 55c respectively which when activated places top link 14 in a hydraulic floating condition when its length is free to change.

The above hitch is operated as follows to hitch-up to an implement using hooks 31 and top link 14.

The driver positions the tractor roughly in front of the implement. He applies the hand brake, activates the front switches 52 and 53 and walks to the front of the tractor adjacent the implement. He operates switches 52 and 53 to position the hooks closer to the implement coupling bar and then unlocks the lower link sub-assembly 12 by operating lever 36 thus releasing the sub-assembly for movement relative to the socket 13 manually moves the sub-assembly 12 relative to socket 13 to couple the hooks 31 onto the implement coupling bar and operates switch position 55a to extend the top link 14 so that it can be connected to the implement. He then makes any further connections to the implement such as PTO drive and hydraulic piping connections with the implement safely coupled to the lower links and the top link.

Float button 55c is then pressed to allow the length of the top link 14 to change in length and the sub-assembly 12 is then retracted into the socket 13 by pressing rocker switch portion 52a which extends the cylinders 15 further thus pushing sub-assembly 12 into socket 13. Eventually latch 39 is engaged to lock the sub-assembly 12 in socket 13. If this does not occur as a result of the operation of cylinders 15 as soon as the hitch is raised (eg by operating switch portion 53a) the sub-assembly 12 falls back into the socket 13 where it is latched by latch 39.

As will be appreciated the hitch therefore greatly simplifies the coupling of an implement to the tractor and avoids any need for the driver to keep leaving the tractor in order to be able to position the hitch sufficiently close to the implement for coupling to occur.

The hitch also includes a draft force sensing system for use when using ground engaging implements. This sensing system is of the form described and claimed in the Applicants co-pending UK patent application No. 0414009.1 (Applicant's Reference 7487) which, with the hitch in as so called neutral position, only provides a draft force signal representative of the horizontal component of the forces applied to the implement by the ground. This eliminates the effect of the weight of the implement from the sensed signal which has hitherto been a problem in relation to front mounted hitches.

Figure 2:
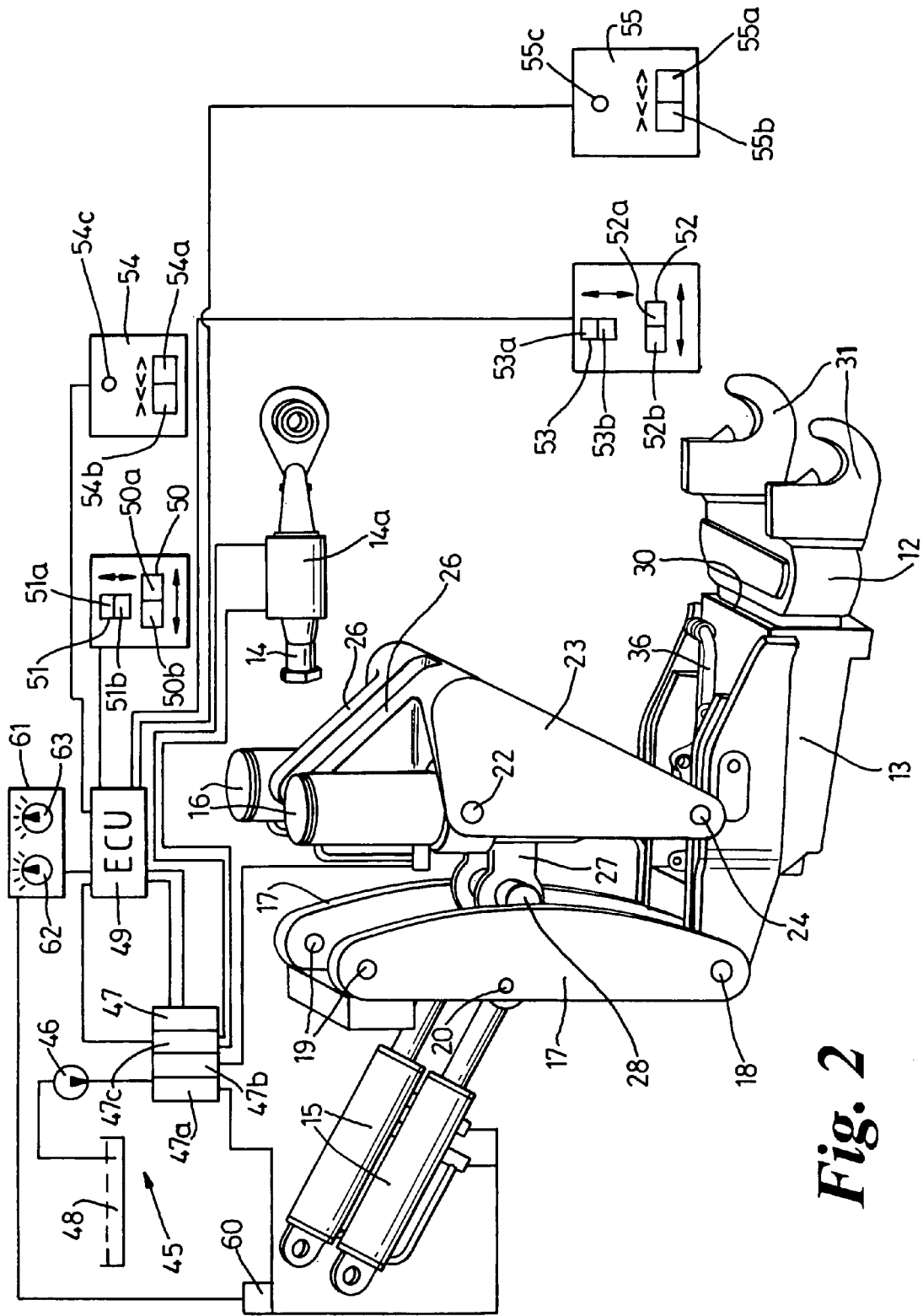
FIG. 2 is a perspective view of the hitch of FIG. 1 with the main frame removed.
Figure 3:
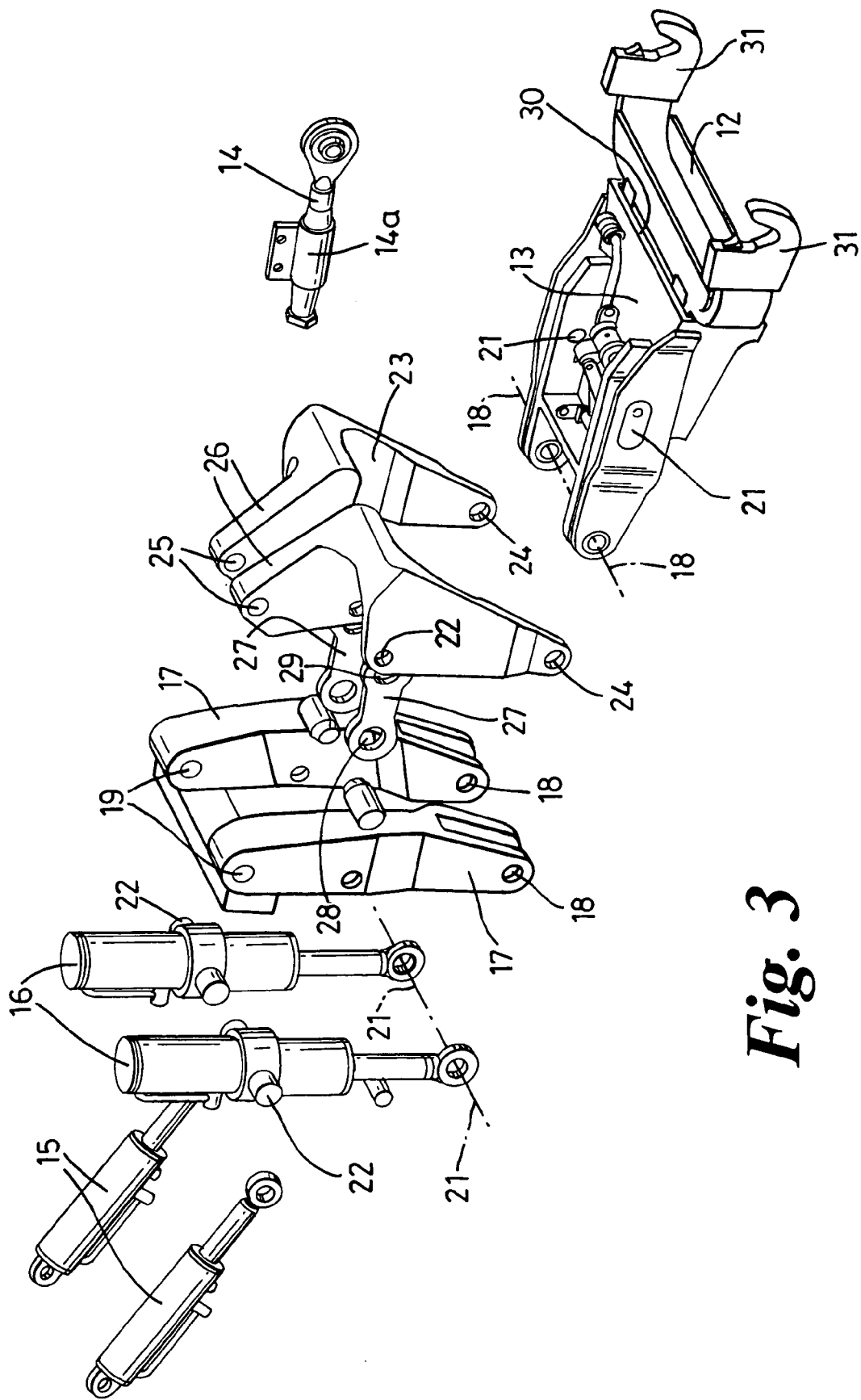
FIG. 3 shows the components of FIG. 2 in an exploded condition.
Figure 4:
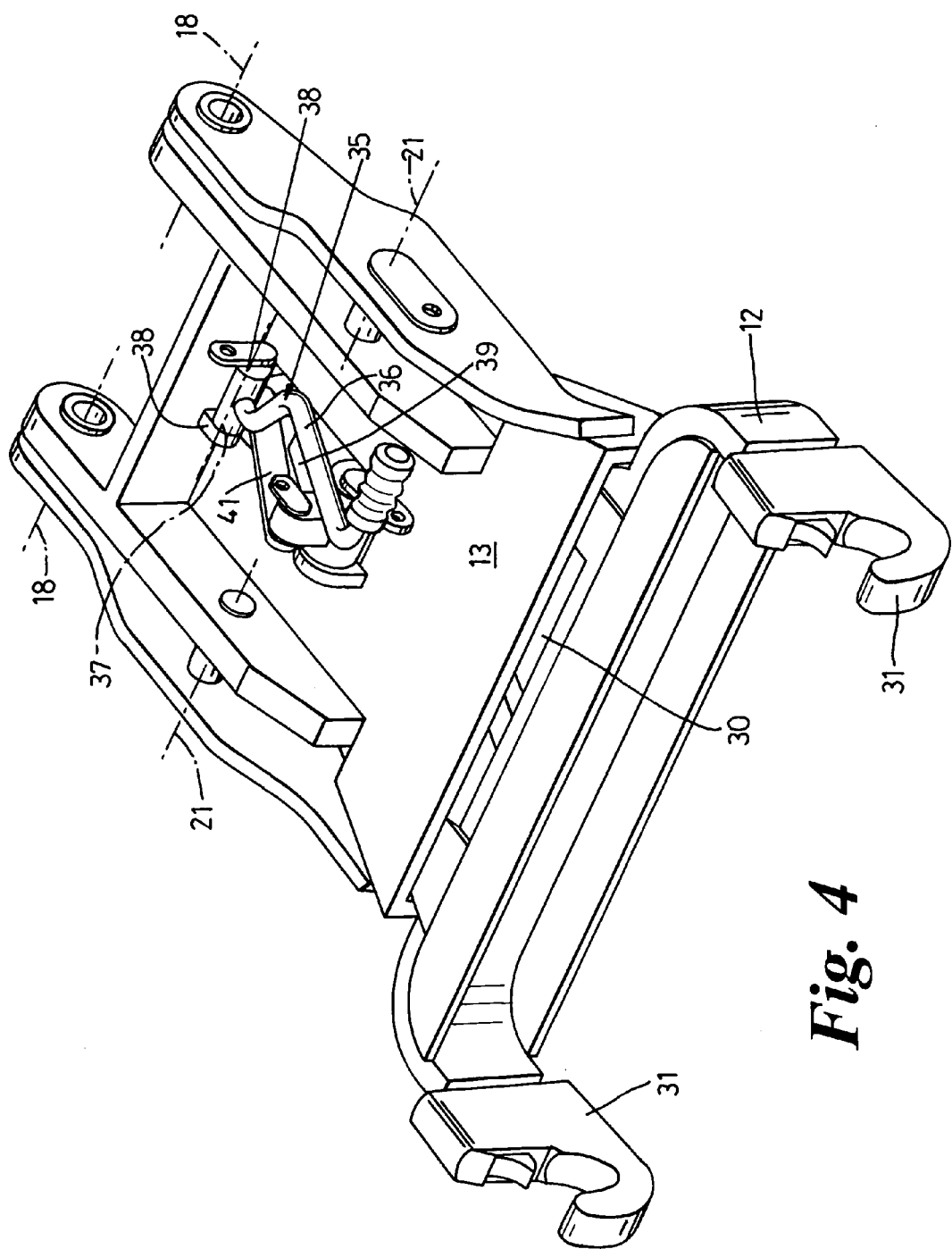
FIGS. 4 and 5 show details of the locking arrangement for the lower links of the hitch in their support socket.
Figure 5:
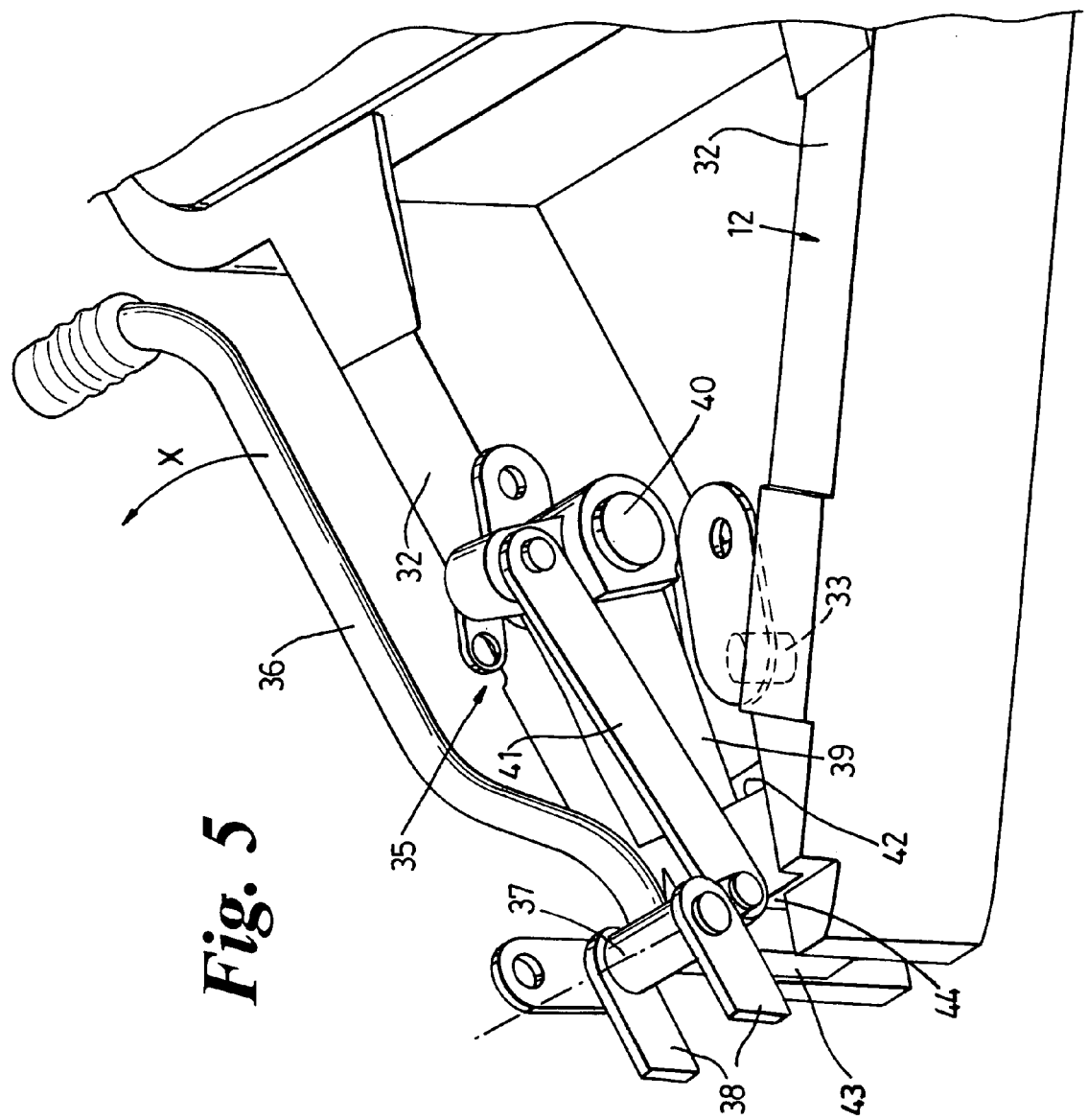
Figure 6:
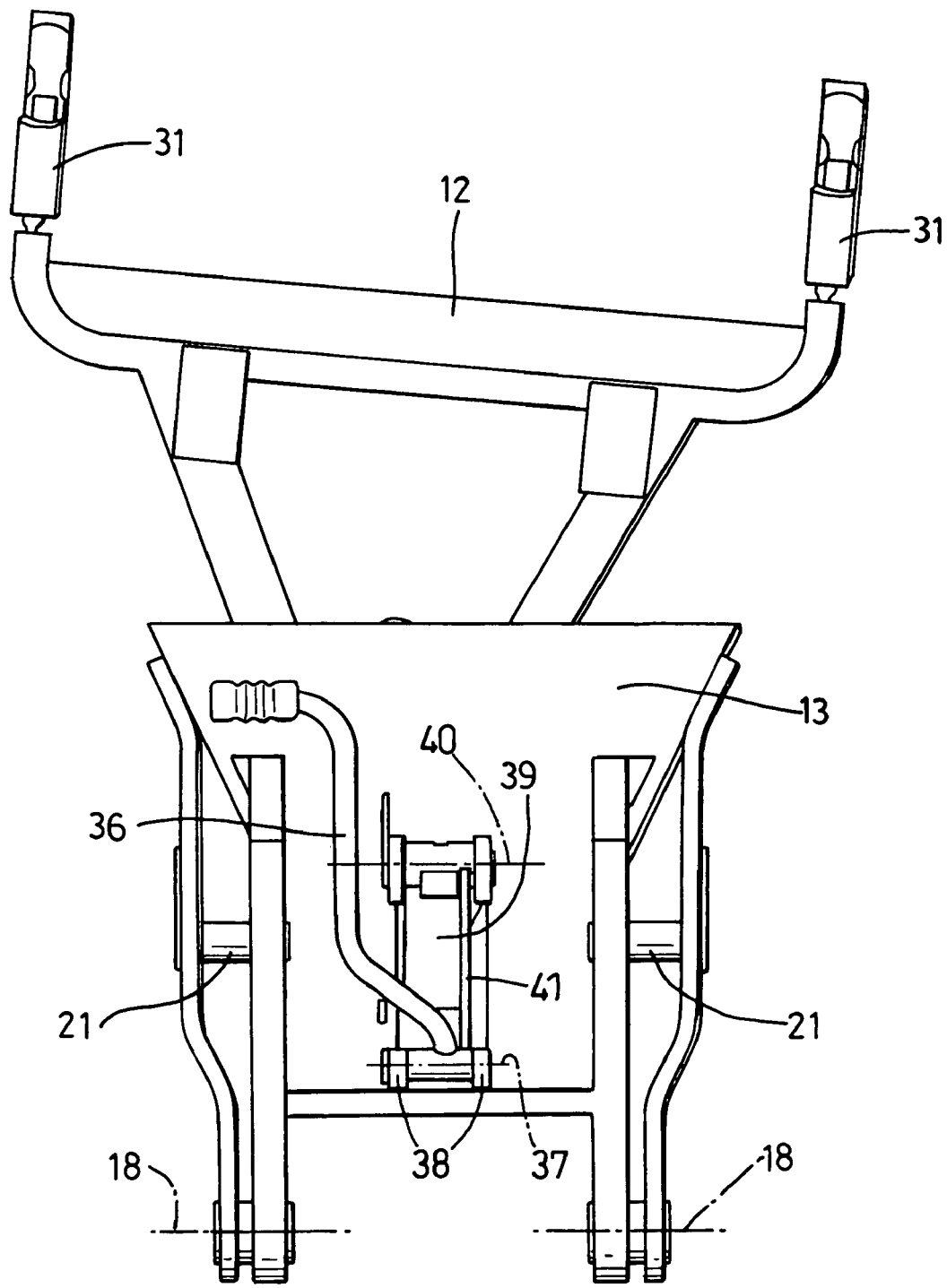
FIGS. 6 and 7 show the extent of movement of the lower links relative to the support socket.
Figure 7:
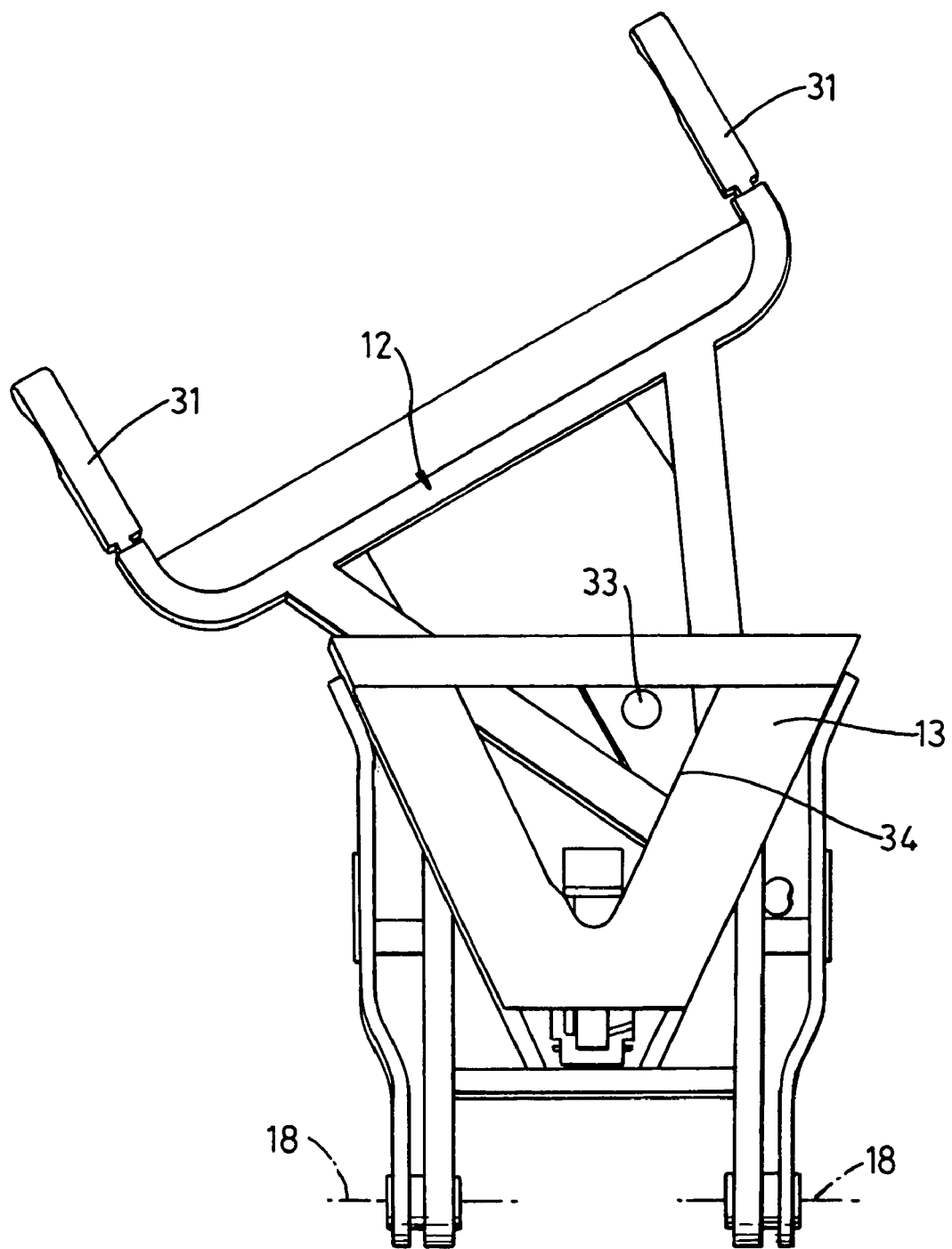
Figure 8:
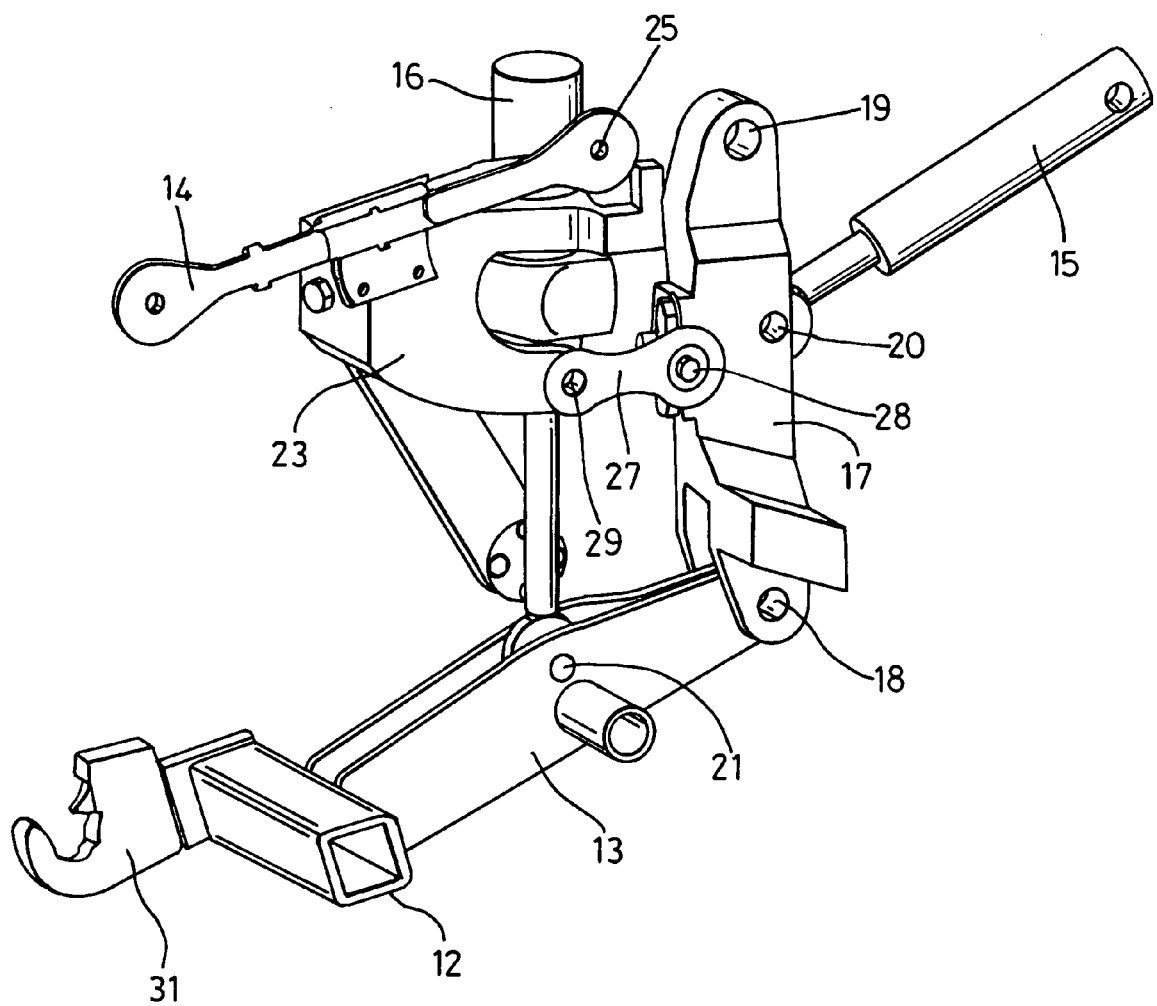
FIG. 8 shows the hitch components of FIG. 2 with half of the hitch cut away for clarity.

This sensing system is provided by the extending cylinders 15, the pressure level in these cylinders being sensed by a pressure sensor 60 (see FIG. 2). This pressure signal is fed as an electrical input into a hitch control unit 61 to provide a signal proportional to the horizontal component of the force applied to the ground engaging implement hitched to links 12 and 14. The control unit also receives input signals from the driver via various input devices such as dials 62 and 63 for setting levels of draft force or implement position etc for the front hitch. These set values of draft force are compared with the force sensed by sensor 60 in unit 61 and an appropriate control signal is issued to valve 47b (either via control unit 49 or direct from unit 61) to raise or lower the implement to achieve the implement control setting set by the driver.

As indicated above the force sensed by sensor 60 is only representative of the horizontal component of the forces applied to the implement by the ground. This can be shown by the following analysis of the forces applied to the cylinders 15 by the hitch when it supports an implement Q as shown diagrammatically in FIG. 9.

Figure 9:
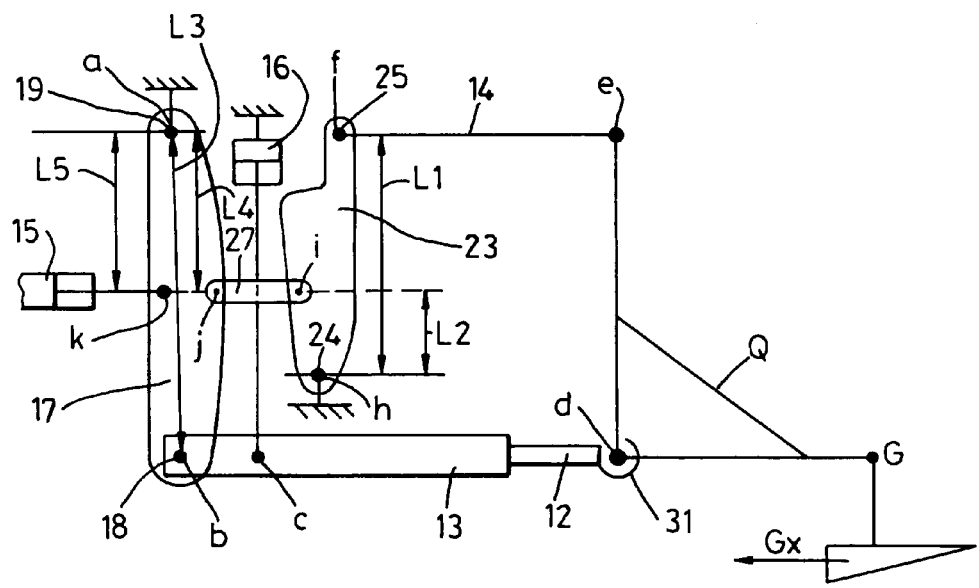
FIG. 9 shows the hitch of FIGS. 1 to 8 diagrammatically to enable a force analysis to be made.

Considering the horizontal forces acting on the implement Q then the horizontal force Gx applied to the implement by the ground is equal to the horizontal forces Dx and Ex applied to the implement by the bottom and top links at points "d" and "e" in FIG. 9.

$$\text{Therefore } Gx=-Dx-Ex \quad \text{equation a1)}$$

If the implement in clear of the ground the Gx=0

$$\text{Therefore } Dx=-Ex \quad \text{equation a)}$$

Considering the horizontal forces acting on the top link 14, the horizontal force Ex applied to the top link by the implement at point "e" (a tensile force) must be equal to the horizontal force Fx applied to the top link at point "f" by the bell crank flanges 26 via pin 25.

$$\text{Therefore } Ex=Fx \quad \text{equation b)}$$

Considering the horizontal forces applied to the socket 13 when the arms 17 are vertical, the force Bx applied by arms 17 via pins 18 at point "b", the force Cx applied at point "c" by the lift cylinders 16, and the force Dx applied at point "d" by the implement Q must balance.

$$\text{Therefore } Bx+Cx+Dx=0$$

If the cylinders 16 are vertical then Cx=0

$$\text{Therefore } Bx=-Dx \quad \text{equation c)}$$

Considering the forces acting on bell crank 23 as it pivots at point H on pins 24 then the moment applied to the bel crank 23 by the top link 14 must be balanced by the moment applied by links 27. Again the bell crank is arranged to be vertical (point "f" vertically above point "h") when the linkage is in the operating condition.

$$\text{Therefore } Ix \cdot L2 = -Fx \cdot L1. \quad \text{equation d)}$$

(where L1 equals the distance between points "f" and "h" and L2 equals the perpendicular distance between line of action of links 27 and point "h").

Considering the forces acting on connecting links 27, the total forces It and Jt applied at points 29 and 28 must balance.

$$\text{Therefore } It=-Jt \quad \text{equation e)}$$

Considering the forces acting on levers 17 when in the operation position (in which the levers are vertical) the torque applied about axis "a" (pins 19) by the cylinders 15 at point "k" (pins 20), the torque applied by links 27 at point "j" (pins 28), and the torque applied by the socket assembly 13 at point "b" (pins 18) must balance.

$$\text{Therefore } K \cdot L5 + J \cdot L4 + Bx \cdot L3 = 0 \quad \text{equation f)}$$

Where L3=distance "ab" since "a" is vertically above "b", L4=the perpendicular distance between point "a" and the line of action of links 27, and L5=perpendicular distance between "a" and the line of action of cylinders 15.

$$\text{Therefore } J \cdot L4 + Bx \cdot L3 = -K \cdot L5$$

Since J=−I and Bx=−Dx from equations e) and c) above $$\text{Therefore } -I \cdot L4 - Dx \cdot L3 = -K \cdot L5$$

$$\text{Therefore } K \cdot L5 = I \cdot L4 + Dx \cdot L3$$

Since Ix=−Fx·L1/L2 from equation d)

$$\text{Therefore } K \cdot L5 = -Fx \cdot L1 \cdot L4/L2 + Dx \cdot L3$$

Since L1/L2=L3/L4=K1 from the basic geometry of the hitch $$\text{Therefore } K \cdot L5 = -Fx \cdot L3 \cdot L4/L4 + Dx \cdot L3$$

Since Ex=Fx from equation b)

$$\text{Therefore } K.L5 = -Ex.L3 + Dx.L3$$
$$= L3[-Ex+Dx]$$

since Dx=−Gx+Ex from equation a1)

$$\text{therefore } K \cdot L5 = L3[-Ex+Ex-Gx]$$

$$\text{therefore } = -L3 \cdot Gx$$

$$\text{therefore } K = -Gx \cdot L3/L5$$

$$\text{therefore } K = -Gx \cdot C \text{ where } C = L3/L5$$

where K is the force applied to the arms 17 by the cylinders 15 which is proportional to the pressure in cylinders which in turn is used as the force sensor.

Figure 10:
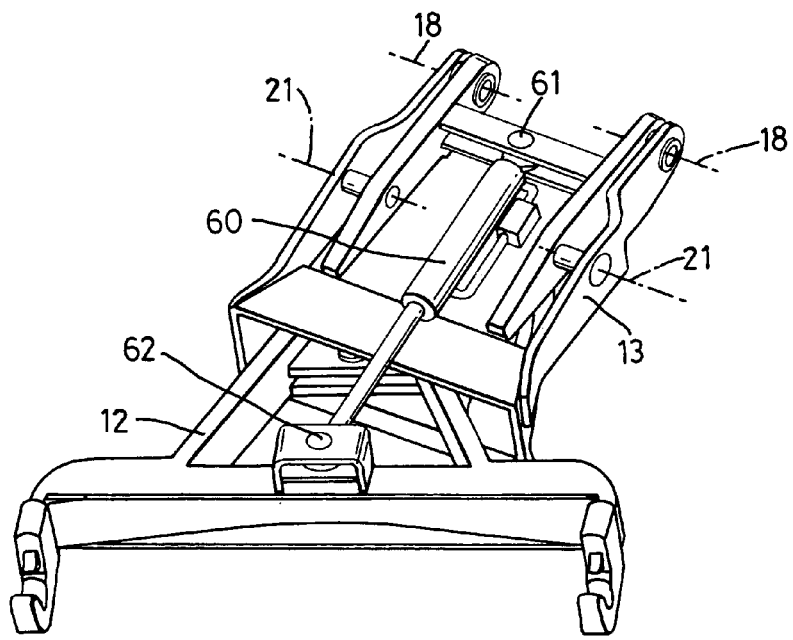
FIG. 10 shows a modified hitch with a socket cylinder to move the lower link sub-assembly relative to the support socket.

The arrangement describe above can be modified by providing a socket cylinder 60 connected between the socket 13 and the lower link sub-assembly 12 as shown in FIG. 10. This cylinder 60 is pinned to the socket at 61 and to the lower link sub-assembly 12 at 62 and can be used to move the sub-assembly out of or into the socket this facilitating further the operation of coupling up an implement. This socket cylinder can conveniently again be controlled by a further rocker switch (not shown) on the front of the tractor.

In yet, a further modification of the present invention the front hitch can be modified by mounting the socket 13 directly on frame 11 for pivoting about pins 18 with raising cylinders 16 acting to raise and lower the socket relative to the frame and with extending cylinders 15 and support arms 17 being eliminated. With this simplified arrangement the moveability of lower link assembly relative to the socket 13 is still retained thus assisting in the coupling up of an implement. In this modification the socket cylinder 60 of FIG. 10 may also be used.

The invention claimed is:

1. A tractor front hitch for mounting an implement on the front of a tractor, the hitch comprising:
    a single socket mounted for pivotal raising and lowering movement relative to the tractor about a first generally horizontal transverse axis,
    a raising means for raising and lowering the socket relative to the tractor,
    a single lower link sub-assembly comprising an inner portion received in the socket and an outer portion outside the socket, and further comprising a pair of lower implement support links for attachment to the implement,
    one or more upper implement support links supported from the tractor, and
    extending means to move the socket horizontally between retracted and extended positions relative to the front of the tractor,
    the inner portion of the lower link sub-assembly being moveable relative to the socket between a coupling position in which the lower link sub-assembly is at least partly withdrawable from the socket to allow movement of the lower link sub-assembly relative to the socket to facilitate coupling of the implement to the lower implement support links and a locked implement operative position in which the lower link sub-assembly is locked in the socket.

2. A hitch according to claim 1 in which the socket and upper implement support link or links are mounted on a frame carried by the tractor.

3. A hitch according to claim 1 in which the socket is of a tapering form being widest at its mouth and the lower link sub-assembly is of a corresponding tapering form.

4. A hitch according to claim 1 in which when the lower link subassembly is partially withdrawn from the socket the sub-assembly is moveable fore and aft and side to side relative to the socket and is also rotatable in the general plane of the socket to facilitate hitching.

5. A hitch according to claim 1 in which the sub-assembly has a releasable stop means which cooperates with the socket to prevent the sub-assembly being inadvertently completely withdrawn from the socket.

6. A hitch according to claim 1 in which the socket has operator controlled locking means for locking the sub-assembly in the socket.

7. A hitch according to claim 6 which is operated by a first lever which carries a further lever which presses on the lower link sub-assembly to move the sub-assembly partially out of the socket when the first lever is moved to release the locking means.

8. A hitch according to claim 1 in which a hydraulic socket cylinder is provided to move the lower link sub-assembly relative to the socket.

9. A hitch according to claim 1 in which the extending means comprises hydraulic cylinder means acting between the socket and frame.

10. A hitch according to claim 1 in which the socket is mounted on one end of a pair of support members for pivoting about the first generally horizontal transverse axis, the other end of the support members being pivoted about a second generally horizontal transverse axis on the frame, extending means acting between the frame and a portion of the support members intermediate their ends so that operation of the extending means pivots the support members in a fore and aft sense relative to the frame about the second axis to move the socket between retracted and extended positions.

11. A hitch according to claim 1 in which the raising means acts on the frame via a bell crank member to which the or each upper implement support link is also connected.

12. A hitch according to claim 11 in which the bell crank member is also connected with the support members by generally horizontally extending link means.

13. A hitch according to claim 1 in which the raising means comprises further hydraulic cylinder means acting between the socket and frame.

14. A hitch according to claim 1 in which operator control means for the extending means are provided at the front of the tractor.

15. A hitch according to claim 1 in which operator control means for the raising means are provided at the front of the tractor.

16. A hitch according to claim 8 in which operator control means for the socket cylinder are provided at the front of the tractor.

17. A hitch according to claim 1 in which the or each upper implement support link can be extended or retracted in length hydraulically and in which operator control means for extending or retracting the or each upper implement support link are provided at the front of the tractor.

18. A hitch according to claim 1 in which raising of the socket after coupling of the extended lower links to an implement causes the sub-assembly with the connected implement to move to its retracted position in the socket under the action of gravity.

19. A hitch according to claim 1 for use with a ground engaging implement in which a sensing system is provided which provides a signal representative of only the horizontal component of the forces applied to the implement by the ground thereby eliminating the effect of the weight of the implement from the sensed signal, and a control means is provided which receives signals from the sensing system and from the tractor operator as to the desired operating condition of the implement and which compares these signals to provide an output signal to the raising means to adjust the working position of the implement to meet the desired operating condition of the implement.

20. A hitch according to claim 18 in which the socket is mounted on one end of a pair of support members for pivoting about a first generally horizontal transverse axis and the other ends of the support members are pivoted about a second generally horizontal transverse axis on the frame, a sensing system comprising a sensor connected with an intermediate portion of the support members and the geometry of the connections between the components of the hitch being such that, when the hitch is in a neutral working position with the raising means acting vertically and the links means horizontal, only the horizontal component of the forces applied to the upper and lower links by the implement is transmitted to the sensor via the hitch.

21. A hitch according to claim 20 in which hydraulic cylinder means are provided to move the socket generally horizontal relative to the tractor between the retracted and extended positions and sensing means are provided to provide a signal indicative of the level of pressure in the hydraulic cylinders of the extending means, this pressure signal being taken as indicating the level of the horizontal component of the forces acting on the implement.

* * * * *